Oct. 3, 1944.   D. A. WALLACE   2,359,497
APPARATUS FOR FORMING LOG SIMULATING PLANKS
Filed Nov. 10, 1941   2 Sheets-Sheet 2
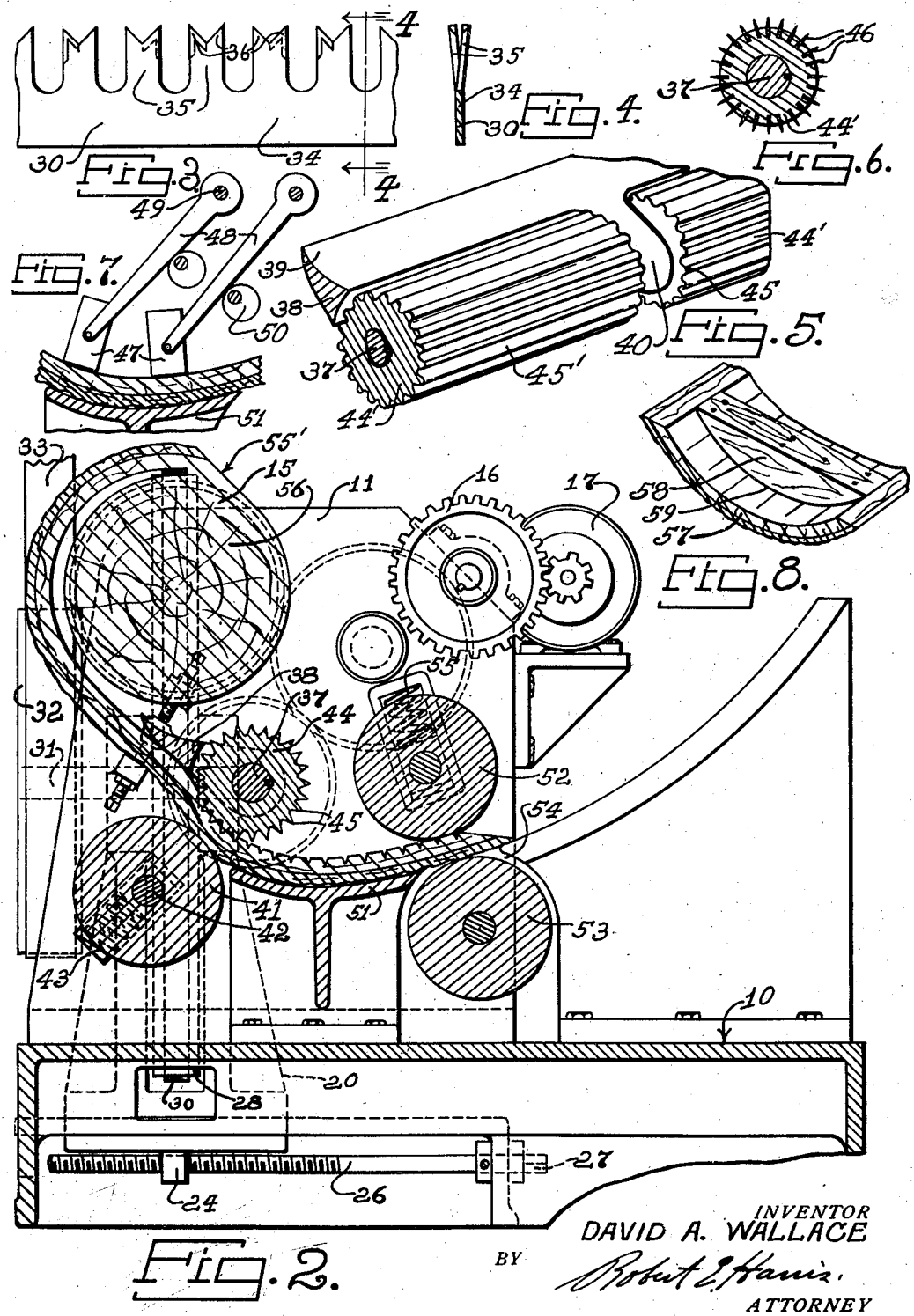
INVENTOR
DAVID A. WALLACE
BY
*Robert E. Harris*
ATTORNEY Patented Oct. 3, 1944

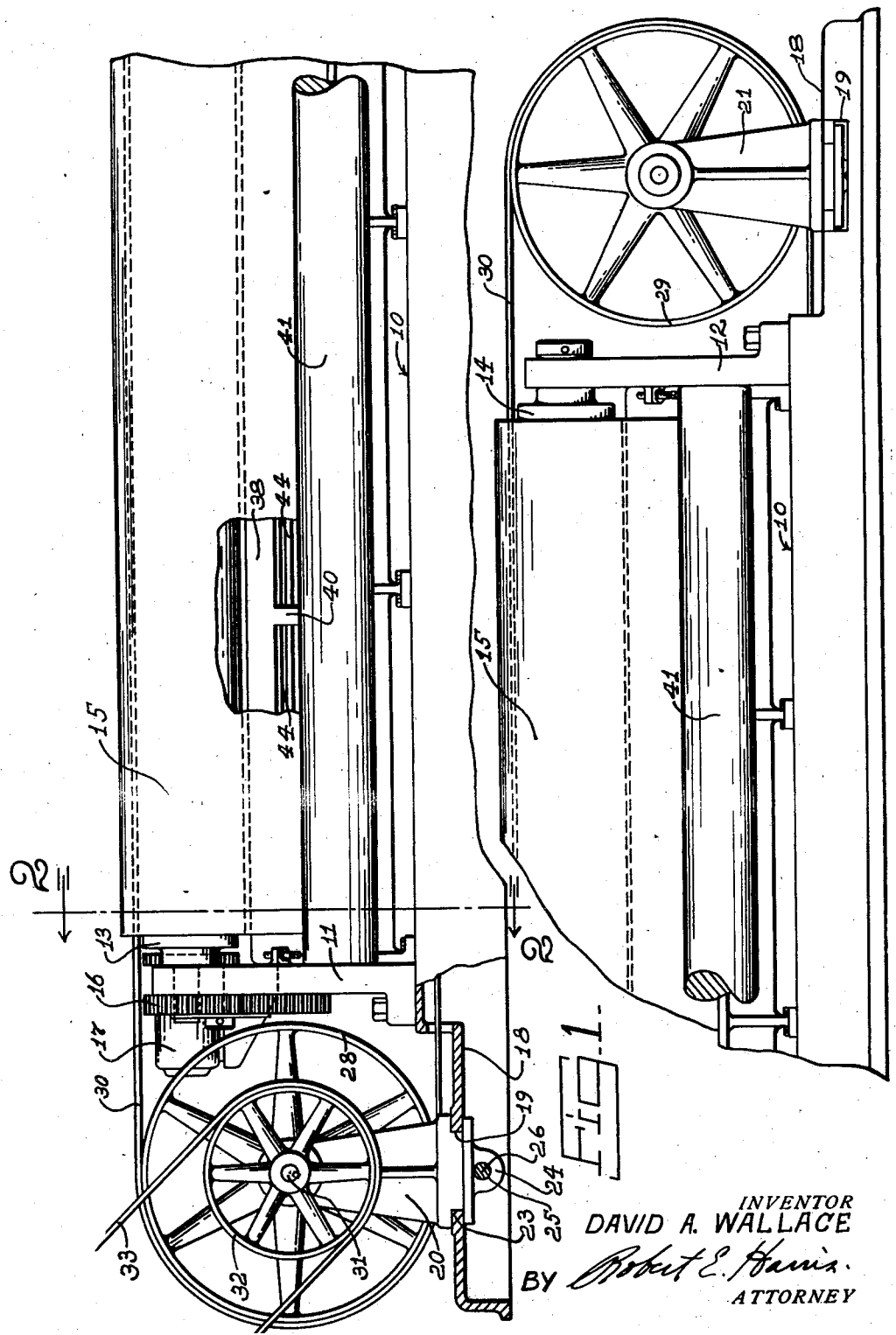

2,359,497

UNITED STATES PATENT OFFICE 2,359,497

APPARATUS FOR FORMING LOG SIMULATING PLANKS

David A. Wallace, Detroit, Mich.

Application November 10, 1941, Serial No. 418,478

5 Claims. (Cl. 144—1)

This invention relates to an improved method and apparatus for forming natural bark covered log simulating planking for cabins, barns, houses and like constructions.

One of the main objects of the invention is to provide an apparatus and method for forming from a log a relatively small diameter a plank of the above character which simulates a log of a much larger diameter.

Another object of the invention is to provide apparatus of this kind which is adapted to cut circumferentially from a log a layer of relatively thin section comprising the entire thickness of the bark thereof and an adjacent layer of wood fiber.

A further object of the invention is to provide means in apparatus of this character for conditioning the fibers at the innermost surface of the wood fiber layer to be stretched without checking to an excessive depth or continuously cracking during spreading of the general cylindrical composite bark and wood fiber layers of stock resulting from the cutting operation.

Other objects of the invention are to provide means in apparatus of this kind for initially feeding a band saw type of cutting blade into the periphery of a log along a chord of the generally circular section thereof substantially to the mid-point of the chord; to provide means for subsequently rotating the log after the cutting blade has reached the above location and during operation of the blade in order to sever from the log a layer of bark and wood of substantially uniform thickness; to provide means for progressively spreading the resulting layer of bark and wood as the latter is severed from the core formation of the log; and to provide means for progressively kneading, partially cutting or otherwise mutilating the inner surface of the wood fiber layer to a predetermined depth as the latter is initially cut and subsequently spread from the core of the log.

An illustrative embodiment of the invention is shown in the accompanying drawings, in which:

Fig. 1 is a side elevational view of a log-like plank forming apparatus embodying the invention.

Fig. 2 is a vertical sectional view taken on line 2—2 of Fig. 1.

Fig. 3 is a fragmentary side elevational view of a band saw type of cutting element that is particularly adapted for use with the improved plank forming apparatus.

Fig. 4 is a vertical sectional view taken on line 4—4 of Fig. 3.

Fig. 5 is a fragmentary perspective view of a combined spreader and kneading roll which may be used in place of the corresponding parts of the apparatus shown in Figs. 1 and 2.

Fig. 6 is a transverse sectional view of a thin blade carrying roll which may be used in place of the kneading roll.

Fig. 7 is a diagrammatic view schematically showing a hammer mill unit which may be employed in conjunction with or in the absence of the kneading or cutting rolls of Figs. 2, 5 and 6.

Fig. 8 is a transverse sectional view of a plank made in accordance with the invention.

In the form of the invention illustrated in the drawings, the plank cutting and forming machine comprises a base 10 on which is mounted spaced upright standards 11 and 12, on the upper end portions of which are journalled live and dead spindles 13 and 14, respectively. A log 15 having a generally circular cross section is adapted to be received between and supported upon the spindles 13 and 14 and to be rotated by the live spindle 13 which is driven through gearing, generally designated by the numeral 16, by a motor 17.

The base 10 has downwardly offset end sections 18 provided with transversely extending slots 19 in which shiftable standards 20 and 21 are mounted for movement transversely of the axis of rotation of the log 15. Each standard 20 and 21 has grooves 23 for receiving the edge portions of the base part 18 adjacent the slots 19 and a downwardly extending lug 24 provided with a threaded aperture 25 in which a screw 26 is threaded. The screw 26 has an accessible square headed end 27 for cooperating with a suitable tool by which the standards 20 and 21 may be adjustably positioned laterally of the base 10. Rotatably mounted on the standards 20 and 21 are wheels 28 and 29 about which extends a continuous band saw member designated by the numeral 30. The wheel 28 has an axle 31 on which is carried a driving pulley 32 through which the band saw is driven by a belt 33.

The blade 34 of the band saw comprises a body portion upon one side of which extends teeth 35 having notched extremities 36. Successive teeth 35 are set outwardly in respectively opposite directions relative to the plane of the blade 34 in order to form a relatively wide cut.

Journalled in bearings carried by the fixed standards 11 and 12 of the base 10 is a shaft 37 which extends longitudinally of the machine and substantially parallel to the axis of rotation of the log 15. This shaft supports a spreader 38 having a tapered free end portion 39 which is arranged to extend between the core of the log and the section severed therefrom by the band saw during operation of the machine. The spreader 38 is carried by spaced arms 40 having apertures therein in which the shaft 37 is rotatably disposed.

A spring-pressed roller 41 is rotatably supported by a shaft 42 extending parallel to the axis of rotation of the log and journalled in bearings carried by the fixed standards 11 and 12. The roller 41 is spaced from the shaft 37 a distance slightly less than the normal thickness of the cut removed by the band saw and it is yieldably urged toward the shaft 37 by coil springs 43 which bear against opposite end portions of shaft 42. Rolls 44 for kneading, cutting or otherwise treating the wood fiber side of the section removed from the log by the saw during operation of the machine are mounted on the shaft 37 between the adjacent arms 40 of the spreader 38. In the form of the invention shown in Fig. 2, each roll 44 has a plurality of sharp pointed triangularly shaped teeth 45 which both sever and knead the fibers of the wood fiber side of the cut section as the latter is fed between the rolls 41 and 44.

The spring-pressed roll 41 may be predetermined in position with respect to the teeth 45 of the roll 44 so that the teeth project on an equal distance into the wood fiber side of all portions of the cut section as the latter is removed from the log 15. If desired the spacing of the rolls 41 and 44 may be so set that an unsevered section of bark and wood fiber of uniform thickness will remain throughout the entire extent of the cut section. This is accomplished by preventing the teeth from extending to their full depth into the wood fiber portion of the cut section at thin portions of the latter.

The teeth 45 of the roll which operates on the wood fiber side of the cut section may be pointed as shown in Fig. 2, or, as provided on the roll 44′ of Fig. 5, the teeth may be rounded as indicated at 45′. Teeth of the latter shape knead rather than sever the fibers of the wood fiber side of the cut section. If desired thin cutting blades 46 of the type shown in Fig. 6 may be employed in place of the teeth 45 of Fig. 2 or the teeth 45′ of Fig. 5.

The purpose of this operation upon the fibers of the wood fiber side of the cut section is to condition it to be extended during spreading of the cut section from its initial curvature on the log to a curvature of a much larger radius. When the fibers are kneaded or severed slightly at closely adjacent locations there is less tendency for deep cracks or checks to form in the wood fiber portion of the cut section for the checking is distributed throughout the widths of the section in the form of small artificially formed checks and cracks.

The wood fiber side of the cut section may be pounded by a hammer mill unit such as shown in Fig. 7, which includes a plurality of hammer heads 47 carried by arms 48 pivotally mounted at 49. Each arm is engaged by a cam shaft 50 by which the hammer heads 47 are repeatedly raised and lowered to strike the wood fiber side of the cut section. This operation may be relied upon to condition the wood fiber side for undergoing expansion as the cut section is spread or it may be employed before or after any of the foregoing kneading or cutting operations.

After each successive portion of the cut section passes between the rolls 41 and 44 it is received by a curved supporting plate 51 and deflected into conformity to the curvature thereof by a pair of rolls 52 and 53. The roll 53 is disposed beneath the plate 51 and has a peripheral portion which extends into a slot 54 formed in the plate. The roll 52 is disposed in alignment with the roll 53 and is urged by springs 55 against the wood fiber side of the cut section. The rolls 52 and 53 aid in holding the cut section against the curved plate 51 as it progressively moves between the rolls 41 and 44.

In the operation of the foregoing apparatus, when the log 15 is centered upon the spindles 13 and 14 it is held against rotation in any suitable manner, preferably manually, while the band saw unit is moved transversely of the base 10 to bring the saw blade into cutting engagement with the log. The blade is preferably positioned to engage the log at a location well within the inner extremity of the bark. Operation of the saw is started and while the log is held against rotation the saw is caused to cut along a chord, designated by the numeral 55′, until the cut reaches the radius 56 of the log which is perpendicular to the chord 55′. This cutting section is produced by moving the shiftable standards 20 and 21 transversely of the machine by operation of the screws 26.

After the saw reaches the above described position the log is rotated counterclockwise as viewed in Fig. 2 during continued operation of the saw. In this manner a circumferential cut is removed from the log which has all of the bark on one side and a substantially thick reinforcing layer of wood fiber. The spreader 38 feeds the cut section between the rolls 41 and 44 where the wood fiber side thereof is subjected to the foregoing treatment and the cut section is deflected to a desired contour as it is moved over the blade 51.

The cut section may be cut longitudinally into widths of desired dimension or the entire width of the cut section may be used to produce a log simulating plank of the character shown in Fig. 8. The arcuate contour of the plank 57 shown in Fig. 8 may be maintained permanently by nailing to the concave side thereof spaced cleats 58 comprising wood and having a curved edge 59 corresponding to the plank curvature desired.

Although but several embodiments of the invention are herein shown and described, it will be understood that various changes may be made without departing from the invention and it is not my intention to limit the scope of the invention other than by the terms of the appended claims.

What I claim is:

1. Apparatus for forming from a bark covered log of relatively small diameter a bark covered log simulating plank of relatively larger apparent diameter comprising relatively shiftable support structures, means on one of said support structures for rotatively mounting a log about an axis extending longitudinally of the latter, a band saw carried by the other support structure having a continuous saw blade portion disposed substantially parallel to said axis, means for producing relative movement of said support structures for bringing said saw blade into operative engagement with said log, mechanism for drivingly rotating said log about its axis during operation of said saw in order to sever said log longitudinally in a course substantially concentric with its axis, means for progressively spreading the severed portion of said log as said blade proceeds to cut the latter in said concentric course, apparatus for subsequently conditioning the fibers on the inner side of the severed portion of said log to withstand tensional stress without excessive cracking during deflection thereof to an arcuate contour of larger radius than said log, and means for thereafter deflecting the severed portion of said log to said arcuate contour of larger radius.

2. Apparatus of the class described comprising means for supporting a log for rotation about its longitudinal axis, a band saw disposed adjacent said means having a saw blade portion adapted to register with a portion of said log spaced inwardly of the inner side of the bark thereof and extending substantially parallel with said axis, means for drivingly rotating said log during operation of said saw while in contact with said log in order to sever therefrom a ring-like section having bark on one side and wood fiber on the opposite side, a spreader adapted to progressively deflect successive portions of said section from the core portion of said log during said cutting operation, a pressure roller for contacting the bark side of said deflected portions of said section as the latter pass said spreader, a roll arranged in opposed relation to said pressure roll having cutting teeth thereon for severing the wood fiber side of said section at spaced intervals, and means for progressively deforming said successive portions of said section to an arcuate contour of larger radius than that of said log.

3. Apparatus of the class described comprising means for supporting a log for rotation about its longitudinal axis, a band saw disposed adjacent said means having a saw blade portion adapted to register with a portion of said log spaced inwardly of the inner side of the bark thereof and extending substantially parallel with said axis, means for drivingly rotating said log during operation of said saw while in contact with said log in order to sever therefrom a ring-like section having bark on one side and wood fiber on the opposite side, a spreader adapted to progressively deflect successive portions of said section from the core portion of said log during said cutting operation, a pressure roller for contacting the bark side of said deflected portions of said section as the latter pass said spreader, a roll arranged in opposed relation to said pressure roll having kneading teeth thereon for severing the wood fiber side of said section at spaced intervals, and means for progressively deforming said successive portions of said section to an arcuate contour of larger radius than that of said log.

4. Apparatus of the class described comprising means for supporting a log for rotation about its longitudinal axis, a band saw disposed adjacent said means having a saw blade portion adapted to register with a portion of said log spaced inwardly of the inner side of the bark thereof and extending substantially parallel with said axis, means for drivingly rotating said log during operation of said saw while in contact with said log in order to sever therefrom a ring-like section having bark on one side and wood fiber on the opposite side, a spreader adapted to progressively deflect successive portions of said section from the core portion of said log during said cutting operation, a pressure roller for contacting the bark side of said deflected portions of said section as the latter pass said spreader, and means for mutilating the fiber of the wood fiber side of said section in order to condition the same to stretch without splitting, and means for progressively deforming said successive portions of said section to an arcuate contour of larger radius than that of said log.

5. Apparatus of the class described comprising means for supporting a log for rotation about its longitudinal axis, a band saw disposed adjacent said means having a saw blade portion adapted to register with a portion of said log spaced inwardly of the inner side of the bark thereof and extending substantially parallel with said axis, means for drivingly rotating said log during operation of said saw while in contact with said log in order to sever therefrom a ring-like section having bark on one side and wood fiber on the opposite side, a spreader adapted to progressively deflect successive portions of said section from the core portion of said log during said cutting operation, a pressure roller for contacting the bark side of said deflected portions of said section as the latter pass said spreader, means for mutilating the fiber of the wood fiber side of said section in order to condition the same to stretch without splitting, the last mentioned means comprising a plurality of hammer members and apparatus for drivingly impelling the same against said wood fiber side of said section, and means for progressively deforming said successive portions of said section to an arcuate contour of larger radius than that of said log.

DAVID A. WALLACE.